United States Patent
Horesh et al.

(10) Patent No.: US 10,255,346 B2
(45) Date of Patent: Apr. 9, 2019

(54) TAGGING RELATIONS WITH N-BEST

(71) Applicant: Verint Systems Ltd., Herzilya Pituach (IL)

(72) Inventors: Yair Horesh, Kfar-Saba (IL); Roni Romano, Even Yehuda (IL); Uri Segal, Jerusalem (IL); Omer Ziv, Ramat Gan (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 566 days.

(21) Appl. No.: 14/608,737

(22) Filed: Jan. 29, 2015

(65) Prior Publication Data

US 2015/0220618 A1    Aug. 6, 2015

Related U.S. Application Data

(60) Provisional application No. 61/934,407, filed on Jan. 31, 2014.

(51) Int. Cl.
| | |
|---|---|
| *G06F 17/30* | (2006.01) |
| *G06N 5/02* | (2006.01) |
| *G06Q 30/00* | (2012.01) |
| *G10L 15/08* | (2006.01) |

(52) U.S. Cl.
CPC .. *G06F 17/30598* (2013.01); *G06F 17/30734* (2013.01); *G06N 5/022* (2013.01); *G06Q 30/01* (2013.01); *G10L 2015/088* (2013.01)

(58) Field of Classification Search
CPC ............................................. G06F 17/30734
USPC ....................................................... 707/738
See application file for complete search history.

(56) References Cited

U.S. PATENT DOCUMENTS

| | | | |
|---|---|---|---|
| 5,737,617 | A | 4/1998 | Bernth et al. |
| 6,076,088 | A | 6/2000 | Paik et al. |
| 6,434,557 | B1* | 8/2002 | Egilsson ........... G06F 17/30333 |
| 6,718,296 | B1 | 4/2004 | Reynolds et al. |
| 7,113,958 | B1 | 9/2006 | Lantrip et al. |
| 8,190,628 | B1 | 5/2012 | Yang et al. |

(Continued)

OTHER PUBLICATIONS

Chen, S.F., et al, "An Empirical Study of Smoothing Techniques for Language Modeling," Computer Speech and Language, vol. 13, 1998, 62 pages.

(Continued)

*Primary Examiner* — Cam Linh T Nguyen
(74) *Attorney, Agent, or Firm* — Meunier Carlin & Curfman

(57) ABSTRACT

Systems, methods, and media for developing ontologies and analyzing communication data are provided herein. In an example implementation, the method includes: identifying terms in in a set of communication data; identifying a list of possible relations of the identified terms; scoring the possible relations according to a set of predefined merits; ranking the possible relations into a list of possible relations in descending order according to their score; and tagging relations in the set of communication data. The relations may be tagged by identifying the possible relations in the communication data in order corresponding with the list of possible relations. The possible relations that have lower rankings that conflict with higher ranking relations are not tagged. The conflicts may be determined by a predefined set of conflict criteria.

21 Claims, 4 Drawing Sheets

(56) References Cited

U.S. PATENT DOCUMENTS

| | | | |
|---|---|---|---|
| 9,189,525 B2* | 11/2015 | Acharya | G06F 17/30796 |
| 9,639,520 B2 | 5/2017 | Yishay | |
| 9,646,605 B2 | 5/2017 | Biatov et al. | |
| 9,697,246 B1 | 7/2017 | Romano et al. | |
| 9,720,907 B2 | 8/2017 | Bangalore et al. | |
| 9,760,546 B2 | 9/2017 | Galle | |
| 2002/0032564 A1 | 3/2002 | Ehsani et al. | |
| 2002/0128821 A1 | 9/2002 | Ehsani et al. | |
| 2002/0188599 A1 | 12/2002 | McGreevy | |
| 2003/0028512 A1 | 2/2003 | Stensmo | |
| 2003/0126561 A1* | 7/2003 | Woehler | G06F 17/3071 |
| | | | 715/256 |
| 2004/0078190 A1 | 4/2004 | Fass et al. | |
| 2006/0248049 A1* | 11/2006 | Cao | G06F 17/30654 |
| 2007/0016863 A1* | 1/2007 | Qu | G06F 17/30731 |
| | | | 715/702 |
| 2008/0021700 A1 | 1/2008 | Moitra et al. | |
| 2008/0154578 A1 | 6/2008 | Xu et al. | |
| 2009/0043581 A1* | 2/2009 | Abbott | G10L 15/187 |
| | | | 704/254 |
| 2009/0099996 A1 | 4/2009 | Stefik | |
| 2009/0150139 A1 | 6/2009 | Jianfeng et al. | |
| 2009/0204609 A1* | 8/2009 | Labrou | G06F 17/3064 |
| 2009/0254877 A1* | 10/2009 | Kuriakose | G06F 8/36 |
| | | | 717/105 |
| 2009/0306963 A1* | 12/2009 | Prompt | G06F 17/30566 |
| | | | 704/9 |
| 2010/0161604 A1 | 6/2010 | Mintz et al. | |
| 2010/0275179 A1 | 10/2010 | Mengusoglu et al. | |
| 2011/0161368 A1* | 6/2011 | Ishikawa | G06F 17/277 |
| | | | 707/776 |
| 2011/0196670 A1 | 8/2011 | Dang et al. | |
| 2013/0018650 A1 | 1/2013 | Moore et al. | |
| 2013/0260358 A1* | 10/2013 | Lorge | G06F 17/30734 |
| | | | 434/362 |
| 2014/0040275 A1 | 2/2014 | Dang et al. | |
| 2014/0075004 A1* | 3/2014 | Van Dusen | H04L 41/04 |
| | | | 709/223 |
| 2014/0297266 A1 | 10/2014 | Nielson et al. | |
| 2015/0066506 A1 | 3/2015 | Romano et al. | |

OTHER PUBLICATIONS

Coursey, K., et al., "Topic identification using Wikipedia graph centrality," Proceedings of the 2009 Annual Conference of the North American Chapter of the Association for Computational Linguistics, Human Language Technologies, Short Papers, 2009, pp. 117-120.

Kral, P., et al., "Dialogue Act Recognition Approaches," Computing and Informatics, vol. 29, 2010, pp. 227-250.

Kumar, N., et al., "Automatic Keyphrase Extraction from Scientific Documents Using N-gram Filtration Technique," Proceedings of the 8$^{th}$ ACM symposium on Document engineering, 2008, pp. 199-208.

Stolcke, A., et al., "Automatic Linguistic Segmentation of Conversational Speech," IEEE, vol. 2, 1996, pp. 1005-1008.

Zimmerman, M., et al., "Joint Segmentation and Classification of Dialog Acts in Multiparty Meetings," Acoustics, Speech and Signal Processing, 2006, pp. 581-584.

\* cited by examiner

TAGGING RELATIONS WITH N-BEST

RELATED APPLICATIONS

This application claims the benefit of U.S. Provisional Applications 61/934,407, filed Jan. 31, 2014, which is incorporated by reference in its entirety for all purposes.

BACKGROUND

The present disclosure relates to the field of automated data processing, and more specifically to the application of ontology programming to process and analyze communication data.

An ontology is a formal representation of a set of concepts, and the relationships between those concepts in a defined domain. The ontology models the specific meanings of terms as they apply to that domain, and may be devised to incorporate one or several different spoken and/or written languages. Communication data may exist in the form of an audio recording, streaming audio, a transcription of spoken content, or any written correspondence or communication. In the merely exemplary context of a customer service interaction, the communication data may be a transcript between a customer service agent or an interactive voice response (IVR) recording with a customer/caller. The interaction may be via phone, via email, via internet chat, via text messaging, etc. An ontology can be developed and applied across all types of communication data, for example, all types of customer interactions (which may include interactions in multiple languages), to develop a holistic tool for processing and interpreting such data.

SUMMARY OF THE DISCLOSURE

The following is a simplified summary of the disclosure to provide a basic understanding of some of the aspects of the examples presented herein. This summary is not intended to identify key or critical elements of the disclosure or to define the scope of the inventions.

The disclosure provided herein describes systems, methods, and media for developing an ontology and analyzing communication data, and more specifically systems, methods, and media for detecting and tagging good relations and the terms composing them. In an example implementation, a method that allows for the detecting and tagging of relations in a set of communication data may include: identifying terms in in a set of communication data; identifying a list of possible relations of the identified terms; scoring the possible relations according to a set of predefined merits; ranking the possible relations into a list of possible relations in descending order according to their score; and tagging relations in the set of communication data. The relations may be tagged by identifying the possible relations in the communication data in order corresponding with the list of possible relations. The possible relations that have lower rankings that conflict with higher ranking relations are not tagged. The conflicts may be determined by a predefined set of conflict criteria.

In some implementations, the step of scoring the possible relations may include assigning relatively higher scores to possible relations whose terms have higher average transcription scores, whose terms have shorter distances between the terms, whose terms are longer, and whose terms appear in the session more times than expected based on an average appearance of the terms in the communication data. Possible relations that have higher frequency of occurrence in the communication data and have better meaning compliance with the other terms in a context vector may also be scored relatively higher.

In some implementations, the predefined set of conflicts may include the following list of criteria: lower ranking possible relations cannot cross with any higher ranking relations; the lower ranking possible relations cannot share a term with any higher ranking relation if it requires assigning more than one entity to that term; and a term of the lower ranking possible relations cannot share a word with a term of higher ranking a possible relation.

In some implementations, the step of tagging may also include tagging relations until the number of tagged relations reaches a threshold number. The threshold number may be defined as half the number of meaning units in the set of communication data.

In some implementation, the method may include identifying themes in the set of communication data based upon the tagged relations. The themes may include groups or categories of relations that are similar in meaning. Additionally, in some implementations an ontological structure is outputted upon completion of the theme identification.

Other systems, methods, media, features and/or advantages will be or may become apparent to one with skill in the art upon examination of the following drawings and detailed description. It is intended that all such additional systems, methods, features and/or advantages be included within this description and be protected by the accompanying claims.

DETAILED DISCLOSURE

Figure 1:
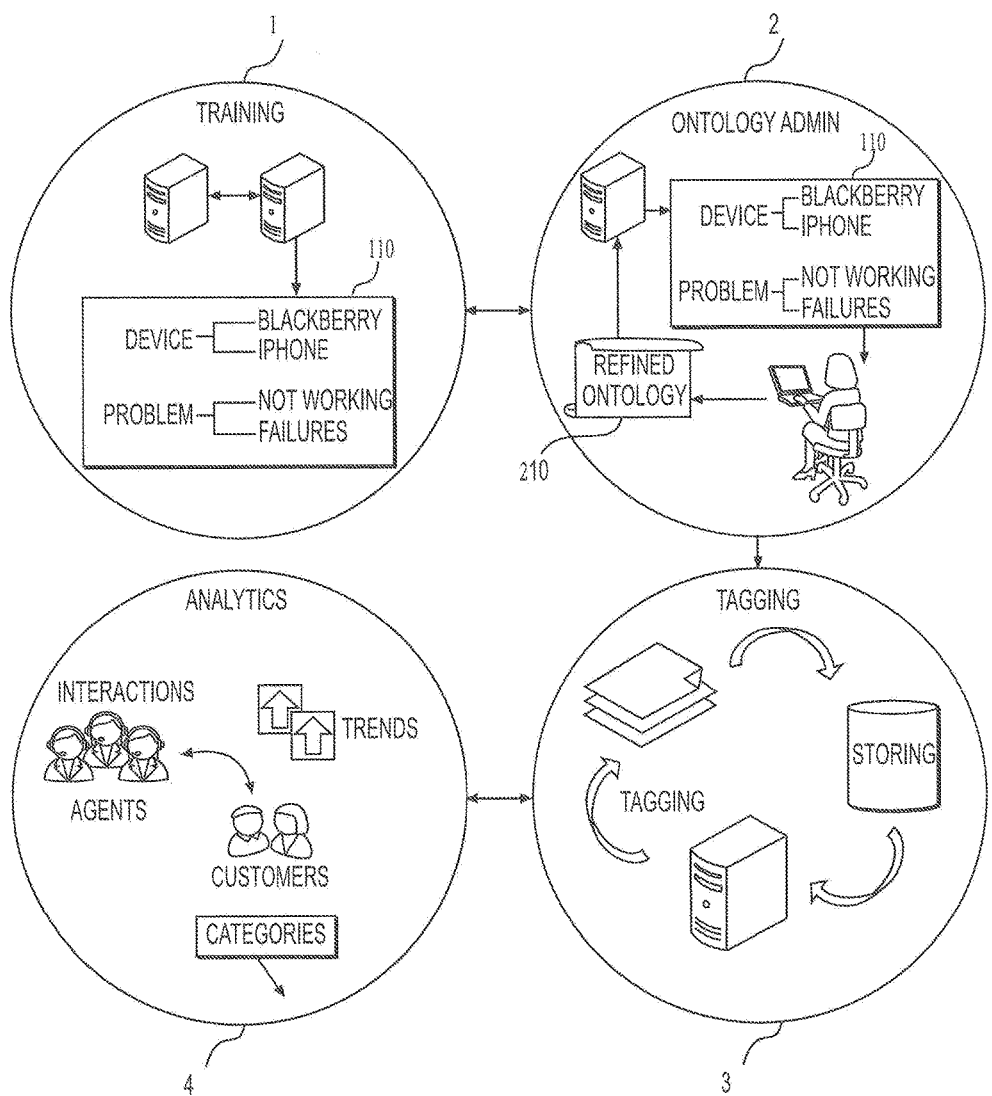
FIG. 1 depicts an exemplary embodiment of the ontology process and programming disclosed herein.

An exemplary embodiment of the presently disclosed ontology solution incorporates four main stages. As seen in FIG. 1, the four main stages include training 1, ontology administration 2, ontology tagging 3, and ontology analytics 4. The training step 1 involves internal machine learning in which the system learns the customer's specific domain and formulates an initial ontology 110. The initial ontology 110 is then passed to the ontology administration step 2 wherein the user reviews the initial ontology 110 and refines it to create a refined ontology 210. The refined ontology 210 is then stored and passed to the tagging module 3. Tagging is a continuous online process that uses the ontology to tag tracked items in incoming interactions, and stores the tagged interactions in a persistent repository. Finally, the tagged interactions are then used by the analytics module 4 to analyze and extract business data based on an enhanced formulization of a company's internal knowledge and terminology. A detailed analysis of each stage is addressed in turn.

In the training phase 1, communication data is transformed into a usable format and then analyzed. For example, audio data from a customer interaction between a customer service agent/IVR and a customer/caller can be automatically transcribed into a textual file through speech recognition techniques. However, challenges exist in automatically interpreting the content and sentiments conveyed in a human communication, exemplarily a customer service interaction. As a non-limiting embodiment, but for the purposes of clarity, an example of a customer service interaction of a plurality of customer service actions between customers/callers and customer service agents is used herein. It is to be understood that this is not limiting on the scope of the communications which may be analyzed as disclosed herein. An ontology, which generally refers to a collection of entities and their relations, is one way in which an automated interpretation of a customer service interaction can be developed, organized, and presented as disclosed herein.

Generally, an ontology as disclosed herein includes terms which are individual words or short phrases that represent the basic units or concepts that might come up in the customer service interaction. Non-limiting examples of terms, as used herein, include "device", "iPhone", "iPhone four", "invoice", "I", "she", "bill", "cancel", "upgrade", "activate", "broken", or "cell phone", "customer care", or "credit card." However, these are not intended to be limiting in any manner and are merely exemplary of basic units or concepts that may be found in a customer service interaction. All words in the corpus can only be associated with one term, and each term can only be counted once.

Strong term candidates contain words or word sets that are compact and, in the instance of word sets, the frequency of finding the word set together is very high. An example of a term containing a word set is "credit card number," as those words very often appear together and refer to a particular, defined object. In addition, good terms often contain words that make more conceptual sense when they are together, as opposed to being on their own. For example, the term "Nova Scotia" is comprised of words that make sense when found together, and would likely not appear or make sense separately.

The frequency that the words of a particular word set, or term, appear together may be referred to as the "stickiness" of the term. A "sticky" term is one whose words appear frequently appear together in the corpus. The higher the stickiness ranking, the stronger the term, as it means that the term has meaning in the corpus as a concept. Salient terms are those that stand out or have a higher score relative to similar or neighboring terms. Non-salient terms are those that appear many times in many different contexts, and the score of non-salient terms is lowered. The logic is that salient terms are likely to be meaningful as a concept, whereas non-salient terms are not likely to express a particular concept. For example, the score of the term "account number" would be higher than the score of the term "the account number" because the word "the" appears in many different contexts and also by itself. Therefore, the word "the" does not add any significant meaning when joined with the term "account number."

Entities are broader concepts that encapsulate or classify a set of terms. Entities describe semantic concepts to which classified terms are related. It is also to be understood that entities may also classify or encapsulate a set of sub-entities, or subclasses, in which the terms are classified. Non-limiting examples of entities, may be include "objects", "actions", "modifiers", "documents", "service", "customers", or "locations". However, these are not intended to be limiting on the types of entities, particularly the types of entities that may appear in an ontology directed to a specific or specialized domain.

Figure 2:
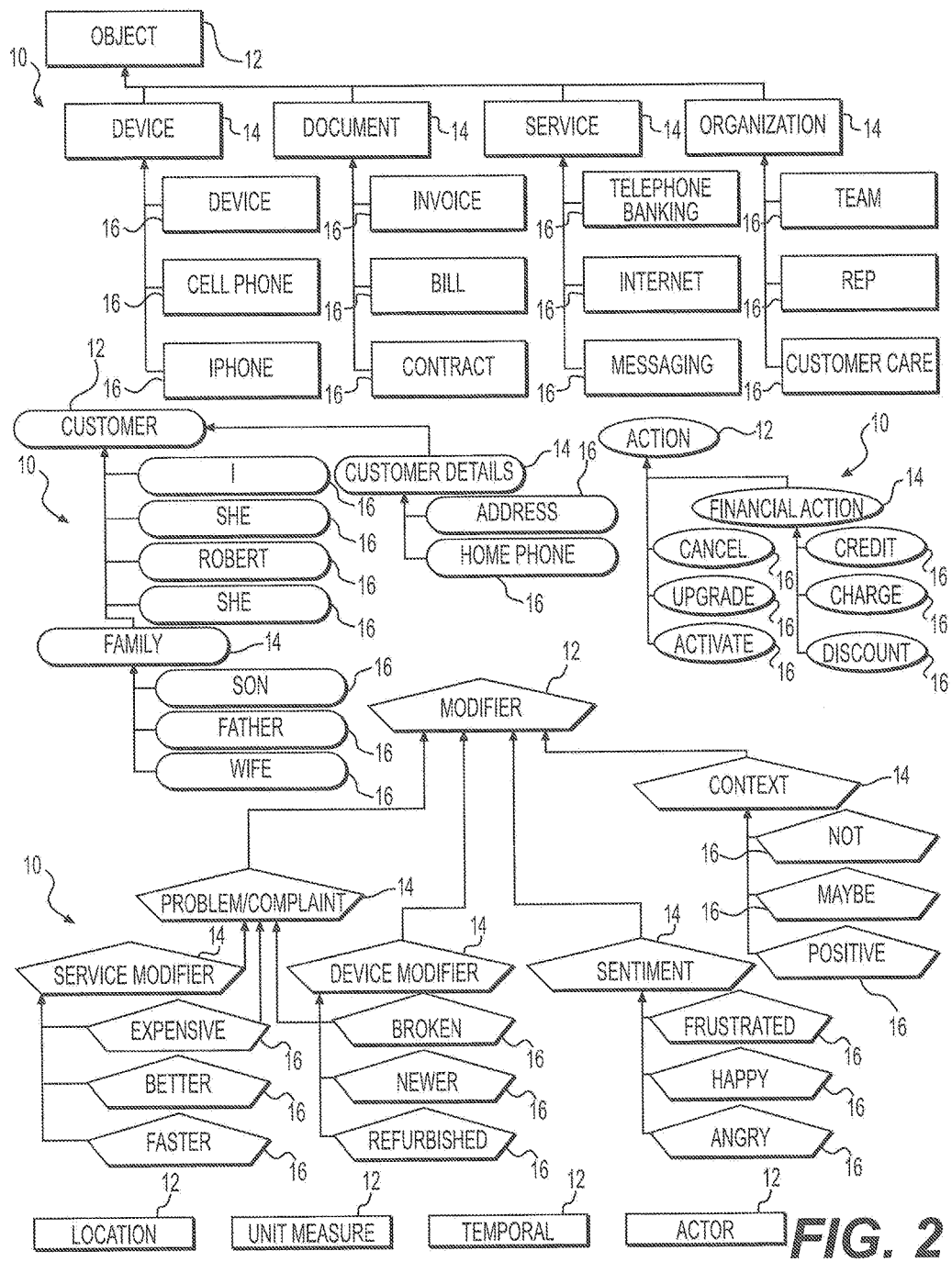
FIG. 2 depicts examples of hierarchical presentations of ontologies developed according to the disclosed process.

The entities, subclasses, and terms are connected by a plurality of relations 308 which are defined binary directed relationships between terms and entities/subclasses or subclasses to entities. In a non-limiting example, the term "pay" is defined under the entity "action" and the term "bill" is defined in the entity "documents". Still further binary directed relationships can be defined between these entity/term pairs. The action/pay pair is related to the document/bill pair in that the payment action requires an underlying document, which may be a bill. In another non-limiting example, the term "broken" is defined in the entity "problems" and the term "iPhone" is defined in the entity "device". The problem/broken pair can also have a directed relationship to the "devices" entity in which the "iPhone" term is a specific example as represented by the devices/iPhone pair. FIG. 2 depicts exemplary, non-limiting embodiments of an ontology 10, including entities 12, subclasses 14, and terms 16. The arrows between the terms/entities/subclasses represent some relations 308 that may exist in the ontology.

Figure 3:
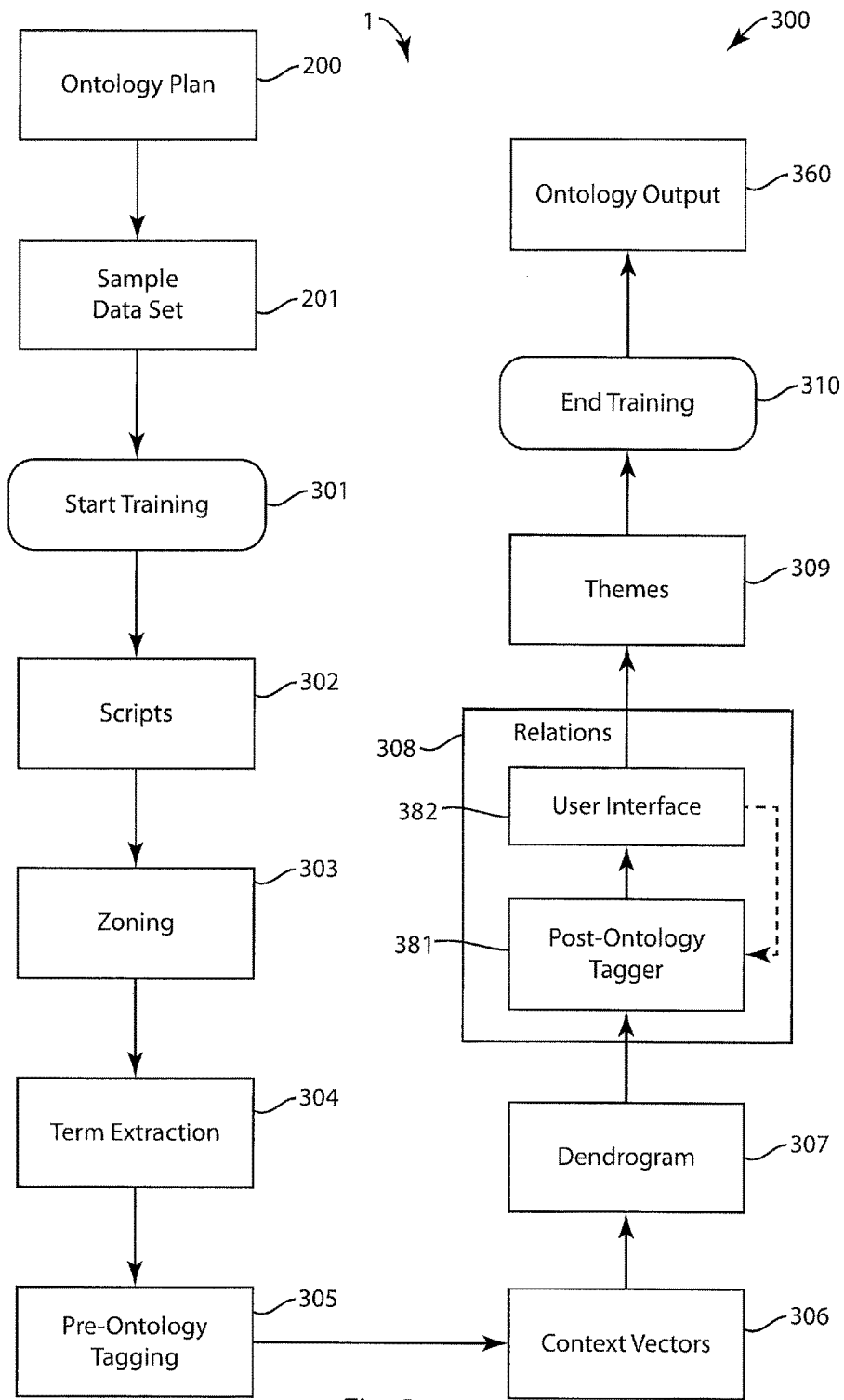
FIG. 3 is a schematic diagram of an embodiment of a process for ontology development.

FIG. 3 represents an overview of an exemplary training phase 1 for developing an initial ontology 110. The initial ontology 110 is built by a step-by-step pipeline process that applies various features to the defined data. These features include the extracting and surfacing of words and phrases in the corpus that helps users make non-trivial observations about a customer-specific domain.

As exemplified in FIG. 3, developing an ontology may begin with the prerequisite steps of developing an ontology plan 200 and sample data set 201. Developing an ontology plan 200 involves assessing a customer's business needs to develop a comprehensive plan for the ontological structure that can process the customer's data to provide the desired result. For example, developing an ontology plan 200 could involve determining how many ontologies are required for a specific customer. For example, customers may decide they need multiple ontologies to handle specialized types of data that can be categorized into different business domains.

Developing the sample data set 201 involves accumulating a good and varied range of data for each planned ontology. The data required for this purpose preferably originates from different time periods, for example, within about a month previous to the date of implementing the training step. The data is validated and gathered from a defined source or sources. The sample data set 201 may include data from a single platform, such as transcriptions of customer service phone calls, or it may include data from multiple platforms, such as customer service calls, emails, web chats, text messages, web page comments, facebook or twitter interactions, customer surveys, etc. In still other embodiments, the sample data set includes other types of business documents such as, but not limited to, white paper, user manuals, service manuals, or catalogs. Preferably, the ontology training process 1 is not executed until a certain, predefined amount of data is gathered for the training. Further, it is preferable to utilize all types of data in the sample data set 201 that the resultant ontology will be applied (e.g., see FIG. 7). In one embodiment, a configured scheduler may monitor the data gathering process and count the number of records or amount of data added. When the number of records or amount of data in the sample data set 201 reaches that predetermined amount, the scheduler may execute the ontology training process 1.

Once the sample data set 201 is fully developed, the training process 1 continues by executing a training module 300, an example of which is further depicted in FIG. 3. At step 301, the sampled data set 201 for each planned ontology 200 is fed into the training module 300. The module 300 then identifies scripts 302 within the sample data set 201. Scripts are lengthy, repeated patterns that appear in the data set 201. Due to their length and historical frequency, scripts are highly likely to be accurately identified and to have emanated from the same speaker. For example, a standard phrase spoken by a customer service agent, such as "Hello, how can I help you?" may comprise a script.

Following the identification of scripts, next, the module 300 executes a zoning process 303 that segments conversations within a defined corpus, or data set, into meaning units. Meaning units are sequences of words that express an idea. In the context of spoken or informal communications, the meaning unit may be the equivalent of a sentence in written communication, such as may be the equivalent of sentences. A non-limiting example of a meaning unit in a customer service context would be the customer statement "I would like to buy a phone."

After the zoning process has been completed for the sample data set 201, the module 300 executes term extraction 304. Term extraction 304 is a process that reviews all meaning units and extracts the terms that are meaningful in a corpus. A term is a short list of words (e.g. between 1 and 5 words) that has a precise meaning, or a meaning that stands out in its context. For example, "credit card" and "your account number" could both be appropriate terms. Next, the module 300 executes a pre-ontology step 305 that tags all terms in a non-overlapping way. For example, according to the explanation provided later herein, a term cannot span two meaning units and two terms can never overlap each other. Similarly, longer terms are generally preferred over shorter ones. For example, the term "my phone number" is counted as one term, rather than two—i.e. "my phone" and "my phone number," also the term embodying three words is selected over the term with two as the term with more words conveys more contextual meaning.

Following the pre-ontology process step 305, the module 300 processes the sample data set 201 to identify context vectors 306. Context vectors 306 are linkages between defined terms in the corpus, or data set, and the words that appear before or after each term. The process begins by creating a linkage between the defined terms in the corpus, and the words that often appear before and after each term (based on a statistical calculation). The logic is to capture a list of terms that are predictive to the occurrence of a main term in the corpus. For example, the term "account" could be preceded by any of several terms, such as "have an," "to your," "a prepaid," "cancel my," or "my husband's." Likewise, the term "account" could be followed by any number of terms, such as "holder's", "receivable", or "been canceled." These so-called left and right context vectors contain the predictive words for a main term, also referred to as a pivot term. Identifying context vectors 306 forms the basis for the next step, building dendrograms 307, which is building a hierarchical clustering of terms. A dendrogram, for example, may center around the term "purchase." The left context vector (preceding term) may be "want to", "need to", etc. While the right context vector (following term) may be "an i-phone", "the service", "high-speed internet."

After the development of the dendrogram 307, relations 308 are developed within the sample data set 201. Relations 308 are connections or relationships between the defined terms in the corpus. For example, "cancel>account," "speak with>supervisor," and "buy>new iPhone" are exemplary relations 308. Identifying and tagging good, meaningful, and accurate relations is important because relations form the building blocks for themes, which intern form the building blocks for analytics 4.

The relations 308 tagger enables the following functions: 1) measuring the relations coverage, e.g. how many relations are tagged per meaning unit, how many terms are incorporated into relations, etc.; 2) presenting relation maps, e.g., presenting diagrams showing the content and/or locations of various relations within a corpus or a subset thereof; 3) helping to define "high level" elements, such as abstract relations, call drivers (i.e., the main subject(s) or purpose(s) of a particular communication, such as a customer service call), and business groups; surfacing weak points in the ontology, e.g. identifying areas of inaccuracy or insufficient data; and allowing a user to experiment with the analytics tools. In order to perform these functions, the relations 308 tagging module may include at least two submodules, including a post-ontology tagger 381 and a user interface 382. The post-ontology tagger 381 detects and tags relations, and the user interface 382 presents the tagged relations 308 and/or data relating thereto to the user for review. The user interface 382 (and 1210 in FIG. 4) also allows the user to experiment with analytics tools to assess whether sufficient tagging has been performed by the post-ontology tagger 381. Thus, in some embodiments the user may use the user interface 382 and 1210 to instruct the training module 300, and more specifically the relations 308 tagging module, to further tag relations and/or amend the relations tags.

The post-ontology tagger 381 system defines a concise number of strong, meaningful relations 308 according to certain pre-defined policies or rules. To do that, all terms must be identified, as is described above. Then the terms are associated with one another as potential relations, and then each relation candidate is ranked according to certain merits. Strong relation candidates that contain those merits are given a higher score, and thus are given preference over other, lower-scoring relations. For example, relation candidates may be defined based on their compliance with one or more of the following six rules.

First, the average transcription score of the terms in the relation should be relatively high. During the transcription process, the transcription server uses a language model to transcribe the text in an interaction. The text is divided into timeslots (measured in milliseconds) to segment the utterances (consecutive stream of words from the same speaker). For each time slot, the transcription engine provides one or more suggestions for each transcribed word, and assigns a transcription score for each suggestion. The transcription score may be derived based on two guiding principles. First, the transcription engine's confidence in the word is determined by the likelihood of its neighboring words (words that come before and after the word). This is calculated by a series of probability tables. Second, an engine's confidence in the word is determined by how close the word comes to the original vocal sound (or the word's source). If the engine surfaces more than one likely candidate for a word, the engine produces a list of candidate words and sorts them based on their transcription score—e.g. from highest to lowest. Thus, if both terms in the relation have high transcription scores (i.e. are likely to be accurate transcriptions), then the relation is preferred over those in which one or more of the terms have a low transcription score. One method or system that may be used to determine such transcription scoring is the N-Best method. For example, a large vocabulary continuous speech recognition (LVCSR) transcription may output a word lattice or a confusion network that conveys multiple or alternative interpretations of the LVCSR transcription, notably, the N-best potential transcriptions. These N-best transcriptions in the form of a word lattice or confusion network undergo speech analytics in order to select the best path out of the N-best transcriptions based upon additional context going through the speech analytics.

Second, the number of occurrences of the relation candidate within an interaction is preferably high. Those relations 308 that occur more frequently in a communication are more likely to be important to the overall meaning of the communication. Thus, those relations may receive a higher score.

Third, a strong relation candidate may be one that complies with the words in close proximity to it. The following example is illustrative.

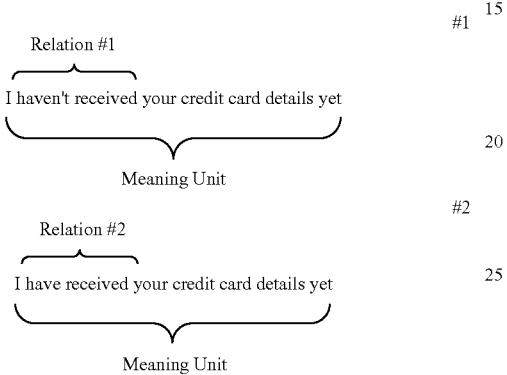

In the above example, the relation "haven't received" in #1 is a stronger relation than "have received" in #2 because it makes more sense within the context of the words in close proximity thereto (haven't received . . . yet, as opposed to have received . . . yet).

Fourth, a relation candidate may be assessed as stronger if the distance between the terms is relatively small. For example, in the meaning unit, or phrase, "I want to cancel my account," the relation between cancel>account is stronger than the relation between want>account because "cancel" and "account" are closer together than "want" and "account", and thus cancel>account would be favored as a stronger relation candidate.

Fifth, a strong relation typically has relatively lengthy terms—i.e. the total number of words in a relation is high. This is because a relation with a higher number of words is likely to convey a more precise meaning and exact context, and is more likely to encapsulate the entire meaning. For example, in the meaning unit "Give me your credit card number," the term "credit card number" is preferred over the term "credit card" because it is a longer term. Likewise, the relation "want to">"talk with manager" is preferred over the relation "want">"manager"

Sixth, and finally, strong relations 308 are those whose terms appear in the interaction more often than expected given the number of occurrences of the relation within the relevant corpus. For example, the post-ontology tagger 381 may prefer relations whose term or terms occur more frequently within the particular communication being examined than they occur on average in other communications in the corpus as a whole. In other words, the post-ontology tagger 381 may prefer those relations that include terms that are highly prevalent in the communication set, such as a call transcript, being examined. Such prevalent relations are likely to be important to the meaning of the communication and are likely to provide useful information that can be employed by the analytics modules.

The post-ontology tagger 381 algorithm may evaluate all possible relations 308, order them by rank, and then tag them, wherein the highest ranking relations are tagged first. The post-ontology tagger 381 tags the relations in descending order, and each relation is tagged unless a conflict arises with an earlier tagged relation. For example, the follow exemplify conflicts between relations. First, relations are not allowed to cross over one another.

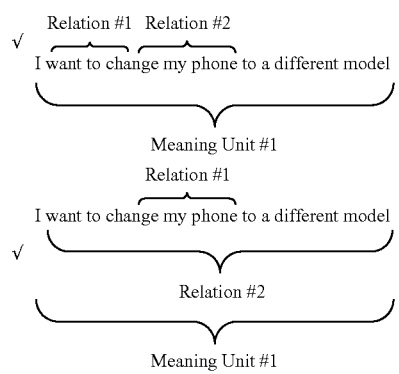

In the above example, the relation want>change and change>phone are each valid relations. Even though they share the term "change", the relations themselves do not cross over each other in the meaning unit. Likewise, the terms in the relations want>different model and change>phone do not cross over each other in the meaning unit, and thus are also valid relations. In the following example, however, the relations want>phone and change>model do cross over each other in the same meaning unit. Therefore, this goes against the relations policy and they are not defined as relations. The example below demonstrates a violation of this policy.

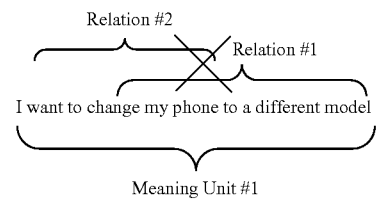

In fact, the relation want>phone does not make sense in this context, as the meaning of the sentence is about "changing" the phone. Likewise, change>model is not a strong relation, as it is unclear what "model" refers to without reading the meaning unit.

Similarly, a term instance in the same meaning unit cannot be assigned to multiple, different entities at the same time. In some cases, the same term in different meaning units could properly take on any one of a number of entities—for example, phone can be assigned to two possible entities, depending on the context in the meaning unit (e.g. the word "phone" can be a noun or a verb: I have a "phone" vs. can I "phone" you). However, a particular term cannot be assigned to more than one entity simultaneously. For example, the algorithm prevents the term "phone" from being assigned to a device and an action entity simultaneously in the same meaning unit. Thus, two relations cannot share a term if it requires assigning the term more than one entity. In practice, this means that if the lower-ranking possible relation shares a term with a higher-ranking, marked relation, and the lower-ranking possible relation assigns a different entity to that term, then the lower-ranking possible relation is not tagged because it is trumped by the higher-ranking relation that has already been marked.

Likewise, a word cannot be assigned to more than one term. For example, the word "phone" in the example below cannot be assigned to more than one term.

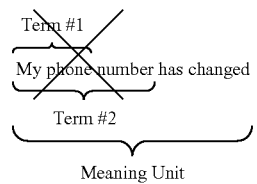

In the above example, there are two potential terms: "my phone" and "my phone number". However, because the words in these terms overlap in the text, they cannot be defined as two separate terms. In this case, the term "my phone number" would be higher ranking because it is longer in length than "my phone," and thus the term "my phone" would not be tagged because it conflicts with the higher ranking term "my phone number."

As mentioned above, the relations 308 are tagged in descending order based on their merit scores, wherein lower-scoring relations that conflict with higher-scoring relations are not tagged. The post-ontology tagger 381 may keep tagging relations until a predetermined threshold is reached. For example, the post-ontology tagger 381 may keep descending through the list of relations and tagging non-conflicting relations until a certain percentage of the relations are tagged, or until all relations having a score above a certain threshold are tagged. In another embodiment, the post-ontology tagger 381 may keep tagging relations until the number of tagged relations reaches a threshold with respect to the number of meaning units, such as tagged relations equals the number of meaning units, or half the number of meaning units.

Based upon the established relations 308, themes 309 are identified in the data set. Themes 309 are groups or categories of relations that are similar in meaning. Themes 309 allow users to easily and efficiently understand the characteristics of interactions throughout the corpus. For example, the theme "got an email" might correspond to several relations, including "got the email," "got confirmation," "received an email," "received an email confirmation," etc.

Upon completion of the theme 309 identification, the training process may be completed 310 and the training module may output an ontological structure 360, such as the initial ontology 110 referred to in the discussion of FIG. 1. In the context of FIG. 1, the initial ontology 110 created by the module 300 may then be fed to an ontology administration module 2 wherein it would undergo further refinement.

Figure 4:
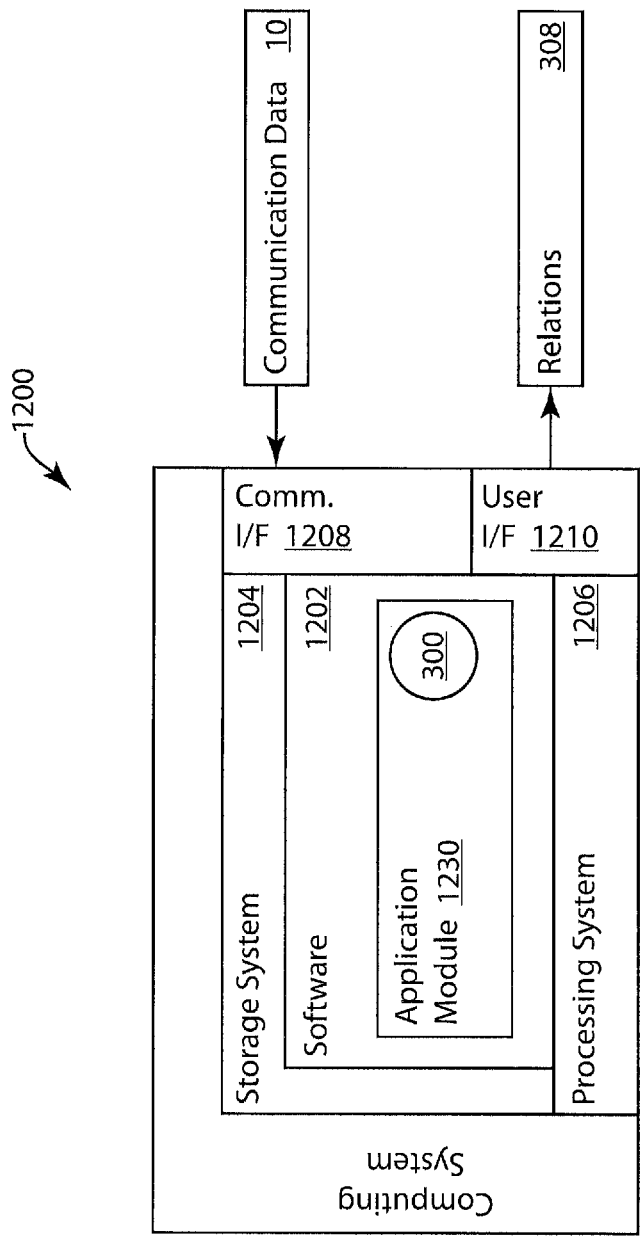
FIG. 4 is a system diagram of a system for creating a communication data summary.

FIG. 4 is a system diagram of an exemplary embodiment of a system 1200 for automated language model adaptation implementing a training module 300. The module 300 may include or be broken into submodules for each ontology creation step, including the module for detecting and tagging relations 308. The system 1200 is generally a computing system that includes a processing system 1206, storage system 1204, software 1202, communication interface 1208 and a user interface 1210. The processing system 1206 loads and executes software 1202 from the storage system 1204, including application module 1230. When executed by the computing system 1200, application module 1230 directs the processing system 1206 to operate as described in herein in further detail, including execution of the module 300.

Although the computing system 1200 as depicted in FIG. 4 includes one software module in the present example, it should be understood that one or more modules could provide the same operation. Similarly, while description as provided herein refers to a computing system 1200 and a processing system 1206, it is to be recognized that implementations of such systems can be performed using one or more processors, which may be communicatively connected, and such implementations are considered to be within the scope of the description.

The processing system 1206 can comprise a microprocessor and other circuitry that retrieves and executes software 1202 from storage system 1204. Processing system 1206 can be implemented within a single processing device but can also be distributed across multiple processing devices or sub-systems that cooperate in executing program instructions. Examples of processing system 1206 include general purpose central processing units, application specific processors, and logic devices, as well as any other type of processing device, combinations of processing devices, or variations thereof.

The storage system 1204 can comprise any storage media readable by processing system 1206, and capable of storing software 1202. The storage system 1204 can include volatile and non-volatile, removable and non-removable media implemented in any method or technology for storage of information, such as computer readable instructions, data structures, program modules, or other data. Storage system 1204 can be implemented as a single storage device but may also be implemented across multiple storage devices or sub-systems. Storage system 1204 can further include additional elements, such a controller, capable of communicating with the processing system 1206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the storage media can be a non-transitory storage media. In some implementations, at least a portion of the storage media may be transitory. It should be understood that in no case is the storage media a propagated signal.

User interface 1210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 1210. As disclosed in detail herein, the user interface 1210 operates to output the detected and/or tagged relations 308.

As described in further detail herein, the computing system 1200 receives communication data 10. The communication data 10 may be, for example, an audio recording or a conversation, which may exemplarily be between two speakers, although the audio recording may be any of a variety of other audio records, including multiple speakers, a single speaker, or an automated or recorded auditory message. The audio file may exemplarily be a .WAV file, but may also be other types of audio files, exemplarily in a pulse code modulated (PCM) format and an example may include linear pulse code modulated (LPCM) audio data. Furthermore, the audio data is exemplarily mono audio data; however, it is recognized that embodiments of the method as disclosed herein may also be used with stereo audio data. In still further embodiments, the communication data 10 may be streaming audio data received in real time or near-real time by the computing system 1200.

This written description uses examples to disclose the invention, including the best mode, and also to enable any person skilled in the art to make and use the invention. The patentable scope of the invention is designed by the claims, and may include other examples that occur to those skilled in the art. Such other examples are intended to be within the scope of the claims if they have structural elements and/or method steps that to not differ from the literal language of the claims, or if they include equivalent structural elements and/or method steps with insubstantial differences from the literal languages of the claims.

What is claimed is:

1. A method of automated development of an ontology via a computer system detecting and tagging relations in a set of communication data, wherein the ontology is a structural representation of language elements and relationships between those language elements within a domain stored in memory of the computer system, the method comprising:
    identifying terms in the set of communication data, wherein the set of communication data comprises audio data from one or more conversations;
    identifying possible relations of the identified terms, wherein each of the possible relations is a binary directed relationship between a pair of the identified terms;
    scoring the possible relations according to a set of predefined merits, including assigning a relatively higher score to one or more of the possible relations whose terms have higher average transcription scores, wherein each of the transcription scores is determined based on selecting a best path out of a word lattice or confusion network of a predetermined number of best potential transcriptions output from a large vocabulary continuous speech recognition (LVCSR) transcription of the audio data;
    ranking the possible relations into a ranked list of the possible relations in descending order according to their score;
    tagging the possible relations in the set of communication data, wherein the possible relations are tagged by identifying the possible relations in the set of communication data in order corresponding with the ranked list of the possible relations, wherein lower ranking possible relations that conflict with higher ranking relations according to a predefined set of conflicts are not tagged; and
    outputting an ontological structure based on the tagged relations to a storage medium for application to incoming communication data to analyze and extract business data from the incoming communication data.

2. The method of claim 1, wherein the step of scoring the possible relations according to the set of predefined merits comprises, assigning relatively higher scores to:
    one or more of the possible relations that have higher frequency of occurrence in the set of communication data;
    one or more of the possible relations that have better meaning compliance with other terms in a context vector;
    one or more of the possible relations whose terms are a shorter distance apart;
    one or more of the possible relations whose terms are longer; and
    one or more of the possible relations with a set of terms that appear in a particular communication session in the set of communication data more times than expected based on an average appearance of the set of terms in other communication sessions in the set of communication data.

3. The method of claim 1, wherein the predefined set of conflicts includes the following list of criteria:
    the lower ranking possible relations cannot cross with any higher ranking relation;
    the lower ranking possible relations cannot share a term with any higher ranking relation if it requires assigning more than one entity to that term; and
    a term of the lower ranking possible relations cannot share a word with a term of any higher ranking possible relation.

4. The method of claim 1, wherein the step of tagging the possible relations includes tagging the possible relations until a number of tagged relations reaches a threshold number.

5. The method of claim 4, wherein the threshold number is defined as half of a number of meaning units in the set of communication data.

6. The method of claim 1, further comprising identifying themes in the set of communication data based upon the tagged relations, wherein the themes are groups or categories of relations that are similar in meaning.

7. The method of claim 6, wherein the ontological structure is output upon completion of the theme identification.

8. A non-transitory computer-readable storage medium in which computer program instructions are stored, which instructions, when executed by a computer, cause the computer to perform a method of automated development of an ontology by detecting and tagging relations in a set of communication data, wherein the ontology is a structural representation of language elements and relationships between those language elements within a domain stored in memory of the computer system, the method including the steps comprising:
    identifying terms in the set of communication data, wherein the set of communication data comprises audio data from one or more conversations;
    identifying possible relations of the identified terms, wherein each of the possible relations is a binary directed relationship between a pair of the identified terms;
    scoring the possible relations according to a set of predefined merits, including assigning a relatively higher score to one or more of the possible relations whose terms have higher average transcription scores, wherein each of the transcription scores is determined based on selecting a best path out of a word lattice or confusion network of a predetermined number of best potential transcriptions output from a large vocabulary continuous speech recognition (LVCSR) transcription of the audio data;

ranking the possible relations into a ranked list of the possible relations in descending order according to their score;

tagging the possible relations in the set of communication data, wherein the possible relations are tagged by identifying the possible relations in the set of communication data in order corresponding with the ranked list of the possible relations, wherein lower ranking possible relations that conflict with higher ranking relations according to a predefined set of conflicts are not tagged; and outputting an ontological structure based on the tagged relations to a storage medium for application to incoming communication data to analyze and extract business data from the incoming communication data.

9. The non-transitory computer-readable storage medium of claim 8, wherein the step of scoring the possible relations according to the set of predefined merits comprises, assigning relatively higher scores to:

one or more of the possible relations that have higher frequency of occurrence in the set of communication data, one or more of the possible relations that have better meaning compliance with other terms in a context vector, one or more of the possible relations whose terms are a shorter distance apart;

one or more of the possible relations whose terms are longer, and one or more of the possible relations with a set of terms that appear in a particular communication session in the set of communication data more times than expected based on an average appearance of the set of terms in other communication sessions in the set of communication data.

10. The non-transitory computer-readable storage medium of claim 8, wherein the predefined set of conflicts includes the following list of criteria:

the lower ranking possible relations cannot cross with any higher ranking relation;

the lower ranking possible relations cannot share a term with any higher ranking relation if it requires assigning more than one entity to that term; and a term of the lower ranking possible relations cannot share a word with a term of any higher ranking possible relation.

11. The non-transitory computer-readable storage medium of claim 8, wherein the step of tagging the possible relations includes tagging the possible relations until a number of tagged relations reaches a threshold number.

12. The non-transitory computer-readable storage medium of claim 11, wherein the threshold number is defined as half of a number of meaning units in the set of communication data.

13. The non-transitory computer-readable storage medium of claim 8, wherein the instructions cause the computer to perform the additional step of identifying themes in the set of communication data based upon the tagged relations, wherein the themes are groups or categories of relations that are similar in meaning.

14. The non-transitory computer-readable storage medium of claim 13, wherein the ontological structure is output upon completion of the theme identification.

15. An apparatus for automated development of an ontology, wherein the ontology is a structural representation of language elements and relationships between those language elements within a domain stored in memory, comprising:

a communication interface configured to receive communication data, the communication data comprising audio data from one or more conversations;

a hardware processor configured to perform the steps comprising:

identifying terms in the received communication data, identifying possible relations of the identified terms, wherein each of the possible relations is a binary directed relationship between a pair of the identified terms;

scoring the possible relations according to a set of predefined merits, including assigning a relatively higher score to one or more of the possible relations whose terms have higher average transcription scores, wherein each of the transcription scores is determined based on selecting a best path out of a word lattice or confusion network of a predetermined number of best potential transcriptions output from a large vocabulary continuous speech recognition (LVCSR) transcription of the audio data, ranking the possible relations into a list of the possible relations in descending order according to their score, tagging the possible relations in the received communication data, wherein the relations are tagged by identifying the possible relations in the communication data in order corresponding with the list of the possible relations, wherein lower ranking possible relations that conflict with higher ranking relations according to a predefined set of conflicts are not tagged, and outputting an ontological structure based on the tagged relations; and a user interface configured to output the tagged relations.

16. The apparatus of claim 15, wherein the step of scoring comprises assigning relatively higher scores to:

possible relations that have higher frequency of occurrence in the received communication data;

one or more of the possible relations that have better meaning compliance with other terms in a context vector;

one or more of the possible relations whose terms are a shorter distance apart;

one or more of the possible relations whose terms are longer; and one or more of the possible relations with a set of terms that appear in a particular communication session in the received communication data more times than expected based on an average appearance of the set of terms in the communication data.

17. The apparatus of claim 15, wherein the predefined set of conflicts includes the following list of criteria:

the lower ranking possible relations cannot cross with any higher ranking relation;

the lower ranking possible relations cannot share a term with any higher ranking relation if it requires assigning more than one entity to that term; and a term of the lower ranking possible relations cannot share a word with a term of any higher ranking possible relation.

18. The apparatus of claim 15, wherein the step of tagging the possible relations includes tagging the possible relations until a number of tagged relations reaches a threshold number.

19. The apparatus of claim 18, wherein the threshold number is defined as half of a number of meaning units in the received communication data.

20. The apparatus of claim 15, wherein the processor is further configured to identify themes in the received communication data based upon the tagged relations, wherein the themes are groups or categories of relations that are similar in meaning, wherein the ontological structure is output upon completion of the theme identification.

21. A method of automated development of an ontology via a computer system detecting and tagging relations in a set of communication data, wherein the ontology is a structural representation of language elements and relationships between those language elements within a domain stored in memory of the computer system, the method comprising:
- identifying terms in the set of communication data, wherein the set of communication data comprises audio data from one or more conversations;
- identifying possible relations of the identified terms, wherein each of the possible relations is a binary directed relationship between an identified term and an entity or subclass or between an entity and a subclass;
- scoring the possible relations according to a set of predefined merits, including assigning a relatively higher score to one or more of the possible relations whose terms have higher average transcription scores, wherein each of the transcription scores is determined based on selecting a best path out of a word lattice or confusion network of a predetermined number of best potential transcriptions output from a large vocabulary continuous speech recognition (LVCSR) transcription of the audio data;
- ranking the possible relations into a ranked list of the possible relations in descending order according to their score;
- tagging the possible relations in the set of communication data, wherein the possible relations are tagged by identifying the possible relations in the set of communication data in order corresponding with the ranked list of the possible relations, wherein lower ranking possible relations that conflict with higher ranking relations according to a predefined set of conflicts are not tagged; and
- outputting an ontological structure based on the tagged relations to a storage medium for application to incoming communication data to analyze and extract business data from the incoming communication data.

* * * * *